(12) United States Patent
Bradley et al.

(10) Patent No.: US 9,407,766 B1
(45) Date of Patent: Aug. 2, 2016

(54) AUTOMATED RESPONSE SYSTEM PROVIDING CUSTOMIZED PROMPTS BASED ON USER SITUATION

(71) Applicant: International Business Machines Corporation, Armonk, NY (US)

(72) Inventors: Lisa M. Wood Bradley, Cary, NC (US); Aaron J. Quirk, Cary, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/048,675

(22) Filed: Feb. 19, 2016

(51) Int. Cl.
*H04M 3/493* (2006.01)
*G10L 15/26* (2006.01)
*H04W 4/18* (2009.01)

(52) U.S. Cl.
CPC .............. *H04M 3/493* (2013.01); *G10L 15/26* (2013.01); *H04W 4/18* (2013.01); *H04M 2250/74* (2013.01)

(58) Field of Classification Search
None
See application file for complete search history.

(56) References Cited

U.S. PATENT DOCUMENTS

| | | | | |
|---|---|---|---|---|
| 6,594,347 B1 * | 7/2003 | Calder | .................. | H04M 3/493 379/88.01 |
| 8,223,931 B1 * | 7/2012 | Lavian | ............... | G06Q 30/0251 370/250 |
| 8,229,091 B2 * | 7/2012 | Romeo | .................. | H04W 4/18 342/457 |
| 2007/0165799 A1 * | 7/2007 | Juncker | ................. | H04M 3/385 379/88.21 |
| 2008/0304639 A1 * | 12/2008 | McDonough | ......... | H04M 3/493 379/93.01 |
| 2009/0154666 A1 * | 6/2009 | Rios | .................... | G06F 3/04895 379/88.18 |
| 2012/0008755 A1 * | 1/2012 | Mittal | ................. | H04M 3/4931 379/93.01 |
| 2012/0315880 A1 | 12/2012 | Peitrow et al. | | |
| 2013/0022191 A1 * | 1/2013 | Or-Bach | ............ | G06Q 30/0269 379/218.01 |
| 2013/0301821 A1 * | 11/2013 | Gilzean | ........... | H04M 1/274566 379/201.01 |
| 2014/0270108 A1 | 9/2014 | Riahi et al. | | |
| 2015/0030143 A1 | 1/2015 | Bhogal et al. | | |

* cited by examiner

*Primary Examiner* — Thomas Dailey
(74) *Attorney, Agent, or Firm* — Sherman IP LLP; Kenneth L. Sherman; Hemavathy Perumal

(57) ABSTRACT

One embodiment provides a device comprising at least one processor, and a storage device storing instructions that when executed by the at least one processor causes the at least one processor to perform operations. The operations include receiving one or more user preferences for a first user, and, in response to the first user of the device initiating a communication, determining a current context of the first user. The current context identifies at least one of the following: a current location of the first user, whether the first user is stationary or driving, and a type of communication channel utilized for the communication. The operations further include selecting a communication format to facilitate the communication based on the current context, a recipient of the communication, and the one or more user preferences for the first user.

1 Claim, 3 Drawing Sheets

AUTOMATED RESPONSE SYSTEM PROVIDING CUSTOMIZED PROMPTS BASED ON USER SITUATION

The present invention generally relates to automated response systems, and more particularly, a response system providing customized prompts/responses based on user situation.

BACKGROUND

In response to receiving a call from a caller, an automated response system typically prompts the caller to provide input. If the automated response system supports voice prompts, the automatic response system may prompt the caller to provide input by speaking. If the automated response system does support voice prompts, the automatic response system may prompt the caller to provide input via a telephone keypad or another input device. For example, the automated response system may prompt the caller using touch tone prompts.

SUMMARY

One embodiment provides a device comprising at least one processor, and a storage device storing instructions that when executed by the at least one processor causes the at least one processor to perform operations. The operations include receiving one or more user preferences for a first user, and, in response to the first user of the device initiating a communication, determining a current context of the first user. The current context identifies at least one of the following: a current location of the first user, whether the first user is stationary or driving, and a type of communication channel utilized for the communication. The operations further include selecting a communication format to facilitate the communication based on the current context, a recipient of the communication, and the one or more user preferences for the first user. If the recipient is an automated system that supports voice prompts and the first user is driving, the communication format selected comprises utilizing at least one voice prompt to collect voice data from the first user. If the recipient is an automated system that does not support voice prompts and the first user is driving, the communication format selected comprises one of the following: utilizing a directive to instruct the first user to speak directly with a representative, or textual data obtained from converting voice data from the first user to text. If the recipient is an automated system that supports textual input and the first user is in a public location, the communication format selected comprises textual data obtained from textual input entered by the first user. If the recipient is an automated system that supports voice prompts only and the first user is in a public location, the communication format selected comprises voice data obtained from converting textual input entered by the first user to voice. If the recipient is a second user, the communication format selected is further based on one or more preferences of the second user.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
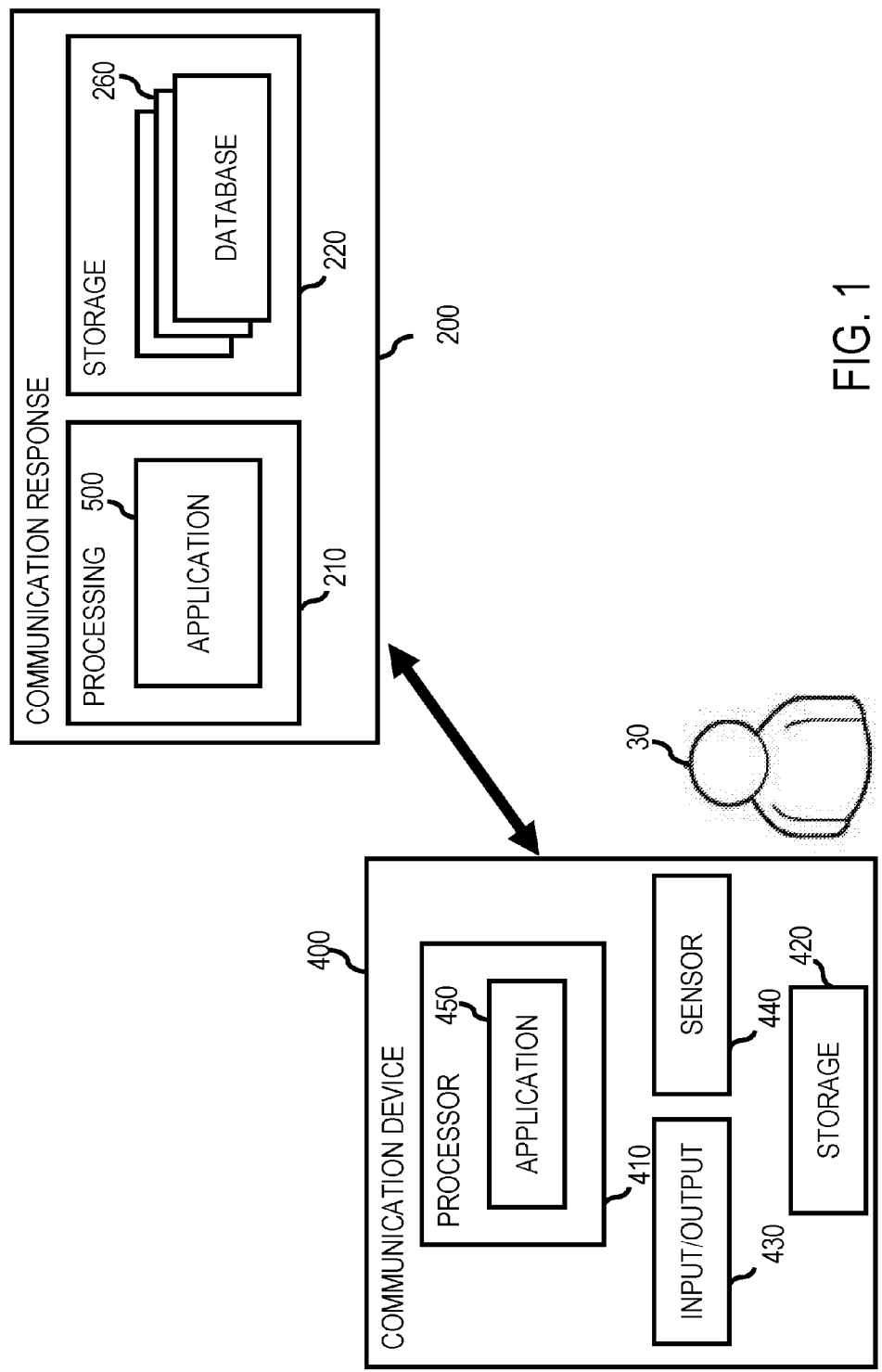
FIG. 1 illustrates an example communication response system, in accordance with an embodiment of the invention.

The detailed description explains the preferred embodiments of the invention, together with advantages and features, by way of example with reference to the drawings.

DETAILED DESCRIPTION

The present invention generally relates to automated response systems, and more particularly, a response system providing customized prompts/responses based on user situation. One embodiment provides a device comprising at least one processor, and a storage device storing instructions that when executed by the at least one processor causes the at least one processor to perform operations. The operations include receiving one or more user preferences for a first user, and, in response to the first user of the device initiating a communication, determining a current context of the first user. The current context identifies at least one of the following: a current location of the first user, whether the first user is stationary or driving, and a type of communication channel utilized for the communication. The operations further include selecting a communication format to facilitate the communication based on the current context, a recipient of the communication, and the one or more user preferences for the first user. If the recipient is an automated system that supports voice prompts and the first user is driving, the communication format selected comprises utilizing at least one voice prompt to collect voice data from the first user. If the recipient is an automated system that does not support voice prompts and the first user is driving, the communication format selected comprises one of the following: utilizing a directive to instruct the first user to speak directly with a representative, or textual data obtained from converting voice data from the first user to text. If the recipient is an automated system that supports textual input and the first user is in a public location, the communication format selected comprises textual data obtained from textual input entered by the first user. If the recipient is an automated system that supports voice prompts only and the first user is in a public location, the communication format selected comprises voice data obtained from converting textual input entered by the first user to voice. If the recipient is a second user, the communication format selected is further based on one or more preferences of the second user.

In this specification, the term "automatic response system" generally denotes a response system that interacts with a user of a communication device without input from a human other than the user. The term "voice prompt" generally denotes a prompt for the user to provide information by speaking (i.e., using his/her voice). The term "touch tone prompt" generally denotes a prompt for the user to provide information using a telephone keypad (i.e., input provided as touch tone presses). The term "user situation" generally denotes a current context/situation of the user.

Conventionally, an automated response system that does not support voice prompts may collect information from a caller using touch tone prompts instead, i.e., prompt the caller to submit information using a telephone keypad. It may be difficult and dangerous, however, for the caller to utilize the telephone keypad while he/she is driving.

Embodiments of the invention provide a response system configured to provide, in response to a user initiating a communication, one or more customized prompts/responses based on information relating to a current context/situation of the user. The response system determines a type of communication format that best fits the user situation, and converts, if necessary, a prompt/response to the type of communication format determined to keep the communication ongoing.

FIG. 1 illustrates an example communication response system 200, in accordance with an embodiment of the invention. The communication response system 200 comprises one or more processing devices 210, and one or more storage devices 220. The storage devices 220 maintain one or more databases 260. As described in detail later herein, one or more applications 500 may execute/operate on the processing devices 210 to provide one or more customized prompts based on user situation.

The communication response system 200 may be implemented on a single electronic device or on a distributed computing environment.

In one embodiment, the processing devices 210 comprise at least one of the following: a hardware processor, or a server.

A user 30 (e.g., a caller or calling party initiating a telephone call, a sender of a text message, etc.) initiates a communication with the response system 200 utilizing a communication device 400. The communication device 400 comprises one or more processors 410, and one or more storage devices 420. One or more communication applications 450 may execute/operate on the processors 410, such as a telephony application, a videotelephony application, a Voice over Internet Protocol (VoIP) application, an instant messaging application, a Short Message Service (SMS) application, etc. The communication device 400 further comprises one or more input/output devices 430, such as a touch screen, a keyboard, a telephone keypad, a microphone, a speaker, a display screen, etc. The communication device 400 further comprises one or more sensor devices 440 for capturing information relating to a current situation of the user 30. For example, the sensor devices 400 may include at least one of the following: an inertial sensor, a WiFi sensor, a Global Positioning System (GPS) sensor, etc.

In one embodiment, the communication device 400 is an electronic device, such as a telephone, a mobile phone, a smart phone, a desktop computer, a laptop computer, a tablet, etc. In one embodiment, the communication device 400 exchanges data with the communication response system 200 over a connection (e.g., a wireless connection, a wired connection, or a combination of the two).

In one embodiment, the communication response system 200 may be utilized as an automatic response system at a service call center for processing and routing incoming customer service calls.

In another embodiment, the communication response system 200 may be integrated into a communication device 400 of a communication recipient (e.g., a callee or called party of a telephone call, a recipient of a text message, etc.). As described in detail later herein, in one embodiment, the communication response system 200 is further configured to customize responses from the communication recipient based on a current situation of both the communication recipient and a user 30 who initiated the communication.

Figure 2:
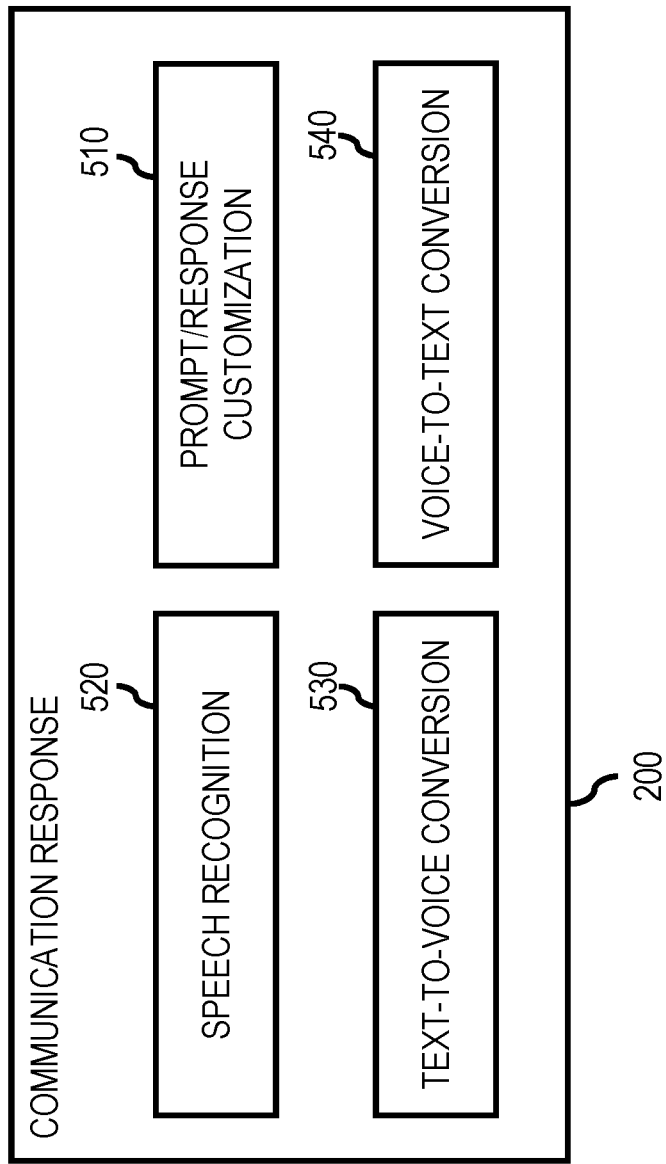
FIG. 2 illustrates the communication response system in detail, in accordance with an embodiment of the invention.

FIG. 2 illustrates the example communication response system 200 in detail, in accordance with an embodiment of the invention. As stated above, one or more applications 500 may execute/operate on the processing devices 210 to provide one or more customized prompts based on user situation. The applications 500 comprise a prompt/response customization unit 510 configured to: (1) receive an incoming communication from a first communication device 400, (2) receive information relating to a first user 30 of the first communication device 400, (3) customize a prompt/response based on the information relating to the first user 30, and (4) send the customized prompt/response to the first communication device 400.

The applications 500 further comprise a speech recognition unit 520 configured to recognize voice data from a user 30, a voice-to-text conversion unit 540 configured to convert voice data to textual data, and a text-to-voice conversion unit 530 configured to convert textual data to voice data.

In one embodiment, the first communication device 400 maintains, on the storage devices 420, one or more user preferences of the first user 30, as specified by the first user 30. The user preferences include preferred response system settings, such as a preferred type of communication format (e.g., text, voice, etc.) of the first user 30. When the first user 30 initiates a communication with the communication response system 200, the first communication device 400 utilizes the sensor devices 440 to capture information relating to a current context/situation of the first user 30, such as a current location of the first user 30 (e.g., a Global Positioning System (GPS) location of the first user 30), whether the first user 30 is moving or stationary, whether the first user 30 is driving, a type of connection/communication channel used for the communication (e.g., a secure/trusted connection, a public Wi-Fi connection, a landline connection, a mobile connection, etc.), etc. The information captured relating to the current context/situation of the first user 30 and at least one of the user preferences of the first user 30 is forwarded to the communication response system 200.

In one embodiment, at least one database 260 of the communication response system 200 maintains user preferences of one or more users 30.

In response to receiving the information captured relating to the current context/situation of the first user 30 and at least one of the user preferences of the first user 30 from the first communication device 400, the prompt/response customization unit 510 determines a type of communication format that best fits the current context/situation of the first user 30, and alters, if necessary, a prompt/response to the type of communication format determined to keep the communication ongoing.

For example, if the communication response system 200 is utilized as an automatic response system that provides support for voice prompts and the first user 30 is driving, the communication response system 200 requests information from the first user 30 by sending one or more voice prompts to the first communication device 400. The voice prompts prompt the first user 30 to provide the information requested using his/her voice (i.e., speak); the voice data collected from the first user 30 using a microphone of the first communication device 400 is returned to the communication response system 200 for processing.

As another example, if the communication response system 200 is utilized as an automatic response system that does not provide support for voice prompts and the first user 30 is driving, the communication response system 200 either: (1) instructs the first user 30 to speak directly with a customer service representative, and routes the incoming communication to the customer service representative, or (2) utilizes the speech recognition unit 520 and the voice-to-text conversion unit 540 to convert any voice data collected from the first user 30 to textual data for processing. The ability to convert voice data to textual data removes the need for the first user 30 to type the information requested (e.g., using a touch screen, a keyboard or a telephone keypad of the first communication device 400) while driving (e.g., no illegal texting while driving).

As another example, if the communication response system 200 is utilized as an automatic response system and the first user 30 is in a public location, the communication response system 200 requests information from the first user 30 by sending one or more text/touch tone prompts to the first communication device 400. The text/touch tone prompts prompt the first user 30 to input the information requested using an input/output device 430 of the first communication device 400, such as a touch screen, a keyboard or a telephone keypad; the textual data/touch tone presses inputted by the first user 30 is returned to the communication response system 200 for processing.

As another example, if the communication response system 200 is utilized as an automatic response system that provide support for voice prompts only and the first user 30 is in a public location, the communication response system 200 utilizes the text-to-voice conversion unit 530 to convert any textual data/touch tone presses inputted by the first user 30 to voice data for processing. The ability to convert textual data/touch tone presses to voice data removes the need for the first user 30 to speak/voice the information requested in the public location, thereby protecting confidential information.

As another example, if the communication response system 200 is utilized as a response system in a second communication device 400 of a second user 30 (i.e., the communication is a user-to-user direct communication), the communication response system 200 is further configured to: (1) collect a response from the second user 30 in a preferred type of communication format of the second user 30, (2) convert, if necessary, the response to a preferred type of communication format of the first user 30, and (3) send the response to the first communication device 400. For example, assume the first user 30 has specified text messages as his/her preferred type of communication format. If the first user 30 sends a text message to the second user 30 while the second user 30 is driving, the second user 30 may respond to the text message using his/her voice. The communication response system 200 of the second communication device 400 utilizes the voice-to-text conversion unit 540 to convert the voice response from the second user 30 to a text response, and sends the text response to the first communication device 400 of the first user 30. The communication response system 200 customizes responses based on a current context/situation and user preferences of both the first user 30 and the second user 30. The communication response system 200 allows the communication to keep going despite differences in user situation and/or user preferences of the first user 30 and the second user 30.

In one embodiment, the communication response system 200 dynamically/adaptively changes a type of communication format for a communication based on a change in a current context/situation of the first user 30. For example, if the first user 30 initiates a communication at a private location (e.g., in a car) and the first user 30 moves to a public location (e.g., the first user 30 has exited the car) during the communication, the communication response system 200 changes from sending voice prompts to the first communication device 400 to sending text/touch tone prompts to the first communication device 400 instead.

Figure 3:
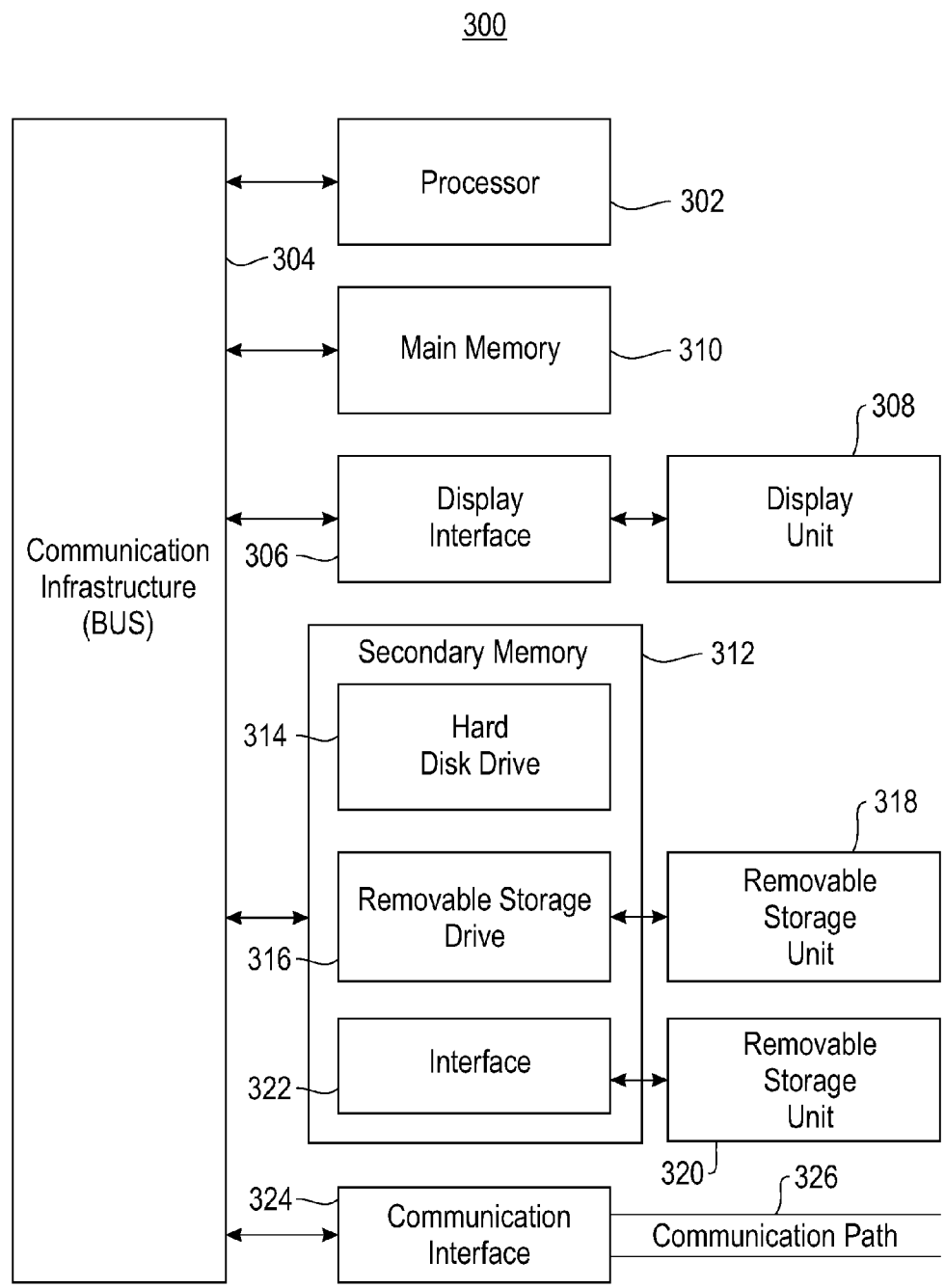
FIG. 3 is a high level block diagram showing an information processing system useful for implementing an embodiment of the present invention.

FIG. 3 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device, comprising:
    at least one processor; and
    a storage device storing instructions that when executed by the at least one processor causes the at least one processor to perform operations including:
        receiving one or more user preferences for a first user; and
        in response to the first user of the device initiating a communication:
            determining a current context of the first user, wherein the current context identifies at least one of the following: a current location of the first user, whether the first user is stationary or driving, and a type of communication channel utilized for the communication; and
            selecting a communication format to facilitate the communication based on the current context, a recipient of the communication, and the one or more user preferences for the first user;
    wherein, if the recipient is an automated system that supports voice prompts and the first user is driving, the communication format selected comprises utilizing at least one voice prompt to collect voice data from the first user;
    wherein, if the recipient is an automated system that does not support voice prompts and the first user is driving, the communication format selected comprises one of the following: utilizing a directive to instruct the first user to speak directly with a representative, or textual data obtained from converting voice data from the first user to text;
    wherein, if the recipient is an automated system that supports textual input and the first user is in a public location, the communication format selected comprises textual data obtained from textual input entered by the first user;
    wherein, if the recipient is an automated system that supports voice prompts only and the first user is in a public location, the communication format selected comprises voice data obtained from converting textual input entered by the first user to voice; and
    wherein, if the recipient is a second user, the communication format selected is further based on one or more preferences of the second user.

* * * * *